United States Patent [19]

Occhionero et al.

[11] Patent Number: 5,047,181
[45] Date of Patent: Sep. 10, 1991

[54] FORMING OF COMPLEX HIGH PERFORMANCE CERAMIC AND METALLIC SHAPES

[75] Inventors: Mark A. Occhionero, Milford; Bruce E. Novich, Lexington; Cathryn A. Sundback, Harvard, all of Mass.

[73] Assignee: Ceramics Process Systems Corporation, Milford, Mass.

[21] Appl. No.: 659,480

[22] Filed: Feb. 25, 1991

Related U.S. Application Data

[63] Continuation of Ser. No. 427,769, Oct. 26, 1989, abandoned, which is a continuation-in-part of Ser. No. 412,108, Sep. 25, 1989, abandoned, which is a continuation-in-part of Ser. No. 180,092, Apr. 11, 1988, abandoned, which is a continuation-in-part of Ser. No. 125,643, Nov. 25, 1987, abandoned, which is a continuation-in-part of Ser. No. 36,085, Apr. 9, 1987, abandoned.

[51] Int. Cl.$^5$ .................. B22F 1/00; C04B 35/64
[52] U.S. Cl. .................. 264/28; 264/56; 264/63; 264/328.2; 419/36; 419/37; 419/40; 419/66
[58] Field of Search ............ 264/28, 56, 63, 328.2; 419/36, 37, 40, 66

[56] References Cited

U.S. PATENT DOCUMENTS

| | | |
|---|---|---|
| 2,765,512 | 10/1956 | Nesbit . |
| 2,869,215 | 1/1959 | Smith . |
| 2,893,102 | 7/1959 | Maxwell et al. . |
| 2,944,316 | 7/1960 | Maxwell et al. . |
| 3,330,892 | 7/1967 | Herrmann . |
| 3,512,571 | 5/1970 | Phelps . |
| 3,567,520 | 3/1971 | Dennery et al. . |
| 3,885,005 | 5/1975 | Downing et al. . |
| 4,011,291 | 3/1977 | Curry . |
| 4,341,725 | 7/1982 | Weaver ................ 264/28 |
| 4,552,800 | 11/1985 | Blasch et al. . |
| 4,734,237 | 3/1988 | Fanelli et al. ............ 264/63 |
| 4,748,352 | 4/1988 | Takahashi et al. ........ 419/36 |
| 4,816,182 | 3/1989 | Novich et al. ........... 264/56 |
| 4,882,088 | 11/1989 | Novich et al. .......... 106/483 |
| 4,882,304 | 11/1989 | Novich et al. ........... 264/56 |
| 4,904,411 | 2/1990 | Novich et al. ........... 264/86 |
| 4,965,027 | 10/1990 | Takahashi et al. ....... 264/28 |

FOREIGN PATENT DOCUMENTS

| | | |
|---|---|---|
| 160855 | 11/1985 | European Pat. Off. . |
| 161494 | 11/1985 | European Pat. Off. . |
| 3011911 | 1/1981 | Fed. Rep. of Germany . |
| 76641 | 5/1984 | Japan . |
| 263703 | 11/1986 | Japan . |
| 2163780 | 5/1986 | United Kingdom . |

OTHER PUBLICATIONS

Chemical Abstrcts 98:165877c, 12/1983.
Kwiatkowski et al., *Ceramurgia International*, vol. 6, No. 2 pp. 79–82 Feb. (1980).

*Primary Examiner*—James Derrington

[57] ABSTRACT

Dense, flaw free, complex, 3-dimensional, metal or refractory shapes are formed by preparing a low viscosity, pourable aqueous-based suspension. The aqueous suspension preferably contains ceramic or metal particulates, water, and a compatible mixture of additives for performing dispersant, cryoprotectant, and strength enhancing functions. The low viscosity slip is cast or injection molded at low pressure into a complex mold, frozen, demolded, and freeze dried without the formation of a continuous liquid phase. The green part is subsequently sintered by conventional techniques to achieve a dense part.

13 Claims, No Drawings

FORMING OF COMPLEX HIGH PERFORMANCE CERAMIC AND METALLIC SHAPES

This application is a continuation of Ser. No. 07/427,769 filed Oct. 26, 1989 now abandoned, which is a continuation-in-part of Ser. No. 412,108, filed Sept. 25, 1989 now abandoned, which is a continuation-in-part of Ser. No. 180,092, filed Apr. 11, 1988, now abandoned, which is a continuation-in-part of Ser. No. 125,643, filed Nov. 25, 1987, now abandoned, which is a continuation-in-part of Ser. No. 036,085, filed Apr. 9, 1987, now abandoned, the disclosures of which are all incorporated herein by reference.

BACKGROUND OF THE INVENTION

1. The Field of the Invention

The present invention relates to a process and a composition suitable for the forming of complex shapes from ceramic or metallic particulates. More particularly, the present invention relates, among other things, to a well-dispersed, cryoprotected composition which can be molded by freezing without inducing defects or textures, lyophilized without the formation of a continuous liquid phase, and subsequently sintered to form a complex high performance shape.

2. The State of the Art

Complexly shaped, three-dimensional, high performance ceramic parts are essential structural and electronic components for a wide variety of industries. High performance properties are those which closely approach the intrinsic properties of the starting material, for example, strength, toughness, uniformity, surface finish, resistivity, optical properties, and thermal expansion. These and other properties are markedly affected by the quality of the starting materials and the manner in which they are processed. Factors that have limited the production of advanced ceramics for high performance applications are (i) poor strength and reliability, stemming from poor raw material quality and improper processing techniques, and (ii) high cost, stemming from low product yields, long processing cycle times, and high capital equipment expenditure. For example, a high strength, high performance alumina article is one which can in some cases be characterized by a fully densified body homogeneously composed of uniform submicron alumina grains. If a processing step introduces a texture or a defect of a critical size, a strength limiting flaw will have been created and will result in a severe departure from the intrinsic or high performance properties desired.

Historically, ceramics have not been used for high performance applications due to poor starting materials and the incorporation of property limiting defects through inadequate processing, both as mentioned above. Only recently has the ceramics community recognized the importance of both the starting materials and the processing technique on the properties of the article produced.

In general, three-dimensional complexly shaped sintered ceramic and metallic parts are manufactured by thermoplastic injection molding, in which ceramic or metal powders are compounded with a mixture of thermoplastic resins at high torque and at high temperature. The resulting mixture has a dough-like consistency, which is why the compounding process is generally referred to as "kneading." Particle dispersion is difficult and tedious to obtain in such a system, and traditionally has been a source of microstructural defects, such as holes and non-uniform particle packing. The mixture is then fed into a high pressure injection molding machine, usually in the form of granules or pellets. The molding machine and the molds used are typically large and expensive because injection pressures can range from approximately 2500 psi to 30,000 psi, thus requiring mold clamping forces in the "tens of tons" range. As the pellets are fed into the injection molding machine, they are remelted and injected through a sprue into a mold cavity. The high viscosity and dough-like consistency of the molding composition can result in weld or knit lines, mold gate, sprue, and parting line textures, all of which can create property limiting defects. After the part is molded, the thermoplastic/ceramic composition is subjected to binder removal, which is typically a long (requiring days), expensive, and deleterious process, particularly for a fine particle matrix typical of a high performance ceramic body. Initially, binder removal can result in bubble formation, delamination, and blistering of the part. During binder removal, which is commonly practiced by heating the article, the polymer/ceramic composite is heated beyond the polymer softening point, and thus dimensional tolerance is difficult to control. After binder removal, the porous particulate body is sintered at high temperatures so that the particulate structure can fuse together, thereby resulting in a dense, strong ceramic that is approximately 20% smaller than the presintered (green) particulate part. Final machining is generally required due to poor dimensional tolerances, parting lines, and gate remnants remaining on the fired part; this final machining commonly imparts defects to the fired part, thereby creating property limiting, especially strength limiting, defects.

An alternate approach to thermoplastic resin molding has been to substitute low temperature melting, low viscosity waxes in place of the thermoplastic resins. While this substitution allows for low pressure injection molding, the problems associated with dispersion, binder removal, machining, green strength, and dimensional tolerances have kept this particular system from wide commercial acceptance.

Historically, investigators have recognized the limitations that the binder has placed on the processing of complexly shaped, three-dimensional parts. The art later began to understand and appreciate that the binder, which had allowed the ceramic and metal particles to be formed into a shape and later handled, was also the cause of many economic and performance problems. Rivers, U.S. Pat. No. 4,113,480, developed an aqueous-based injection molding process exclusively for metal powders using 1.5 to 3.5 wt. % (metal powder basis) of high viscosity methylcellulose additive to provide green strength. The resulting mixture of metal powder, water, and methylcellulose has a "plastic mass" consistency and could be injection molded at 8,000 psi. The molded mass was then thermally dried and the green part was conventionally sintered. Although binder burnout is eliminated in this particular process, the presence of defects and costs associated with dispersion and molding of a high viscosity mix, as well as the implementation of a necessary but difficult thermal drying step, still remain.

The use of a molding vehicle which could be frozen has been investigated as an alternate method for casting or molding without the use of thermoplastic carriers. Sublimative drying by freeze drying (lyophilization) has been shown to be generally less destructive to the particle fabric in the green part during drying. A. Kwiatkowski et al., "Preparation of Corundum and Steatite Ceramics by the Freeze Drying Method," *Ceramurgia International*, vol. 6, no. 2, pp. 79-82 (1980). Such a method has been described by Nesbit, U.S. Pat. No. 2,765,512, which describes casting a ceramic shape from a thick slip containing water and ceramic particles which are then frozen into a shape while in the mold. The resulting frozen part was demolded, dried at room temperature and pressure, and subsequently fired. Downing et al., U.S. Pat. No. 3,885,005, has cast coarse grained refractory shapes from a slip containing 70% coarser than #200 mesh ceramic particles, water, and a silica sol binder. The resulting cast shape was subsequently frozen, causing the silica to gel and cementing the refractory particles together. The residual water was frozen and the part was demolded and heated to 200° F. (93.3° C.) to thaw and dry the part. Dennery et al., U.S. Pat. No. 3,567,520, in making metal parts from powdered metals, formed a thin aqueous-based paste sheet into a part, the part was frozen at $-60°$ F. ($-51.1°$ C.) and then freeze-dried to overcome thermal drying stresses which would be destructive to the part. Maxwell et al., U.S. Pat. No. 2,893,102, cast and molded thicker parts from an aqueous ceramic slip in which the slip and mold were frozen in a $CO_2$ bath followed by freeze drying and sintering.

As a slight departure from the art thus described, Weaver et al., U.S. Pat. No. 4,341,725, describes the use of a cryoprotectant as an additive in an aqueous suspension to inhibit ice crystal growth, which, after drying, can cause severe strength limiting defects. Weaver claims that the foregoing prior art would result in "low performance" articles riddled with scars resulting from ice crystal formation. By using hydrogen bonding additives in a hydrogen bonding medium, Weaver et al. claimed to limit the size of ice crystals formed to those on the order of 20-50 microns (micrometers).

Another technology that has been investigated uses a gelation process to form the green article. For example, Fanelli et al., in U.S. Pat. No. 4,734,237, use an amount of agar in their slurry and effect gelation by raising the temperature. Gelation can also be caused by phase changes, such as freezing, as exemplified by the Blasch et al. disclosure in U.S. Pat. No. 4,552,800, which teaches using a freeze-sensitive colloidal silica sol that-gels irreversibly upon freezing. Yet another method is found in Japanese laid-open application 61-158403 (from application 59-279176), which teaches what is termed freezing the dispersant by lowering the slurry temperature; the final temperature is significantly above the freezing temperature of the slip vehicle. Among the drawbacks to using a gelation process are (i) the continued presence of thermal drying (i.e., that there is a continuous liquid phase during drying, which leads to destructive capillary forces) and (ii) the relatively slow kinetics of gelation in comparison with freezing by the present invention (the slower the solidification rate, the higher the probability for particle rearrangement and degraded green and sintered properties).

SUMMARY OF THE INVENTION

We have invented a process for producing complexly shaped, three-dimensional ceramic and metallic parts having nearly ideal and tailored microstructures, which process uniformly and reproducibly yields part properties closely approaching those of the intrinsic material. This process by which uniform ceramic and metallic microstructures can be produced preferably includes the steps of mixing to provide a nearly ideal dispersion, filtering, low pressure molding or casting, freezing without the formation of textures or property limiting defects, gentle but rapid sublimative drying without the formation of a continuous liquid phase, and rapid lower temperature sintering. Further, the present process eliminates the binder removal and reduces or eliminates conventionally machining steps, both of which are traditional sources of defects resulting in non-uniformity of the final part. Still further, larger cross sections can be made using the present invention while also attaining a high surface detail replication and resolution, for example, high as-molded and as-fired surface finish. As useful in this process, the present invention also provides a composition including components which act both as dispersants for the ceramic or metallic particles and as cryoprotectants. The invention is described below in more detail with respect to various specific embodiments.

The present invention provides ceramic or metallic articles having a uniform, homogeneous composition, a smooth surface finish, a dense or uniformly porous defect-free microstructure, a texture-free surface, and a high dimensional tolerance. This invention also obviates the need for a binder burnout step, thereby precluding deformations and the imparting of defects typically created by such a processing stage. In essence, this invention provides the ability to control defects on a particle size scale, on the order of less than about one micron, in contrast to the 20-50 micron defects with which the art has typically been concerned.

This invention provides a process for producing a sintered ceramic or metallic article which comprises providing a stable, pourable suspension consisting essentially of at least about 35% by volume of ceramic or metallic particles and a vehicle composed of a dispersant, at least one cryoprotectant, and the remainder water, shaping the suspension in a closed mold at a pressure of less than about 200 psi, chilling the mold temperature to less than the freezing point of the vehicle, solidifying the shaped suspension by rapidly freezing the shaped suspension, freeze drying the solidified shape without the formation of a continuous liquid phase, and firing the dried shape.

This invention also provides a process for producing a sintered ceramic or metallic article which comprises providing a pourable, stable suspension of at least about 35 vol. % ceramic or metallic particles and a vehicle composed of an amount of a component effective both to disperse the particles and to provide cryoprotection and the remainder water, shaping the suspension in a closed mold at a pressure of less than about 200 psi, chilling the mold temperature to less than the freezing temperature of the vehicle, solidifying the shaped suspension by rapidly freezing the shaped suspension, freeze drying the solidified shape without the formation of a continuous liquid phase, and firing the dried shape.

DETAILED DESCRIPTION OF SPECIFIC EMBODIMENTS

The present invention is an integrated process, from powder preparation to sintering, for the production of high performance, simply and complexly shaped ceramic and metallic parts. This process can be used for a wide variety of oxide and non-oxide monolithic and composite ceramic compositions; exemplary ceramic compositions include, but are not limited to, the oxides, carbides, nitrides, silicides, borides, silicates, titanates, zirconates, and the like and mixtures thereof, of aluminum, beryllium, boron, lanthanum, lead, silicon, tungsten, titanium, zirconium, and mixtures thereof; this also includes composite powders such as SYALON AA and SYALON 101 grades of powder for making SiAlON articles (both available from Vesuvius Zyalons, Mid Flamorgan, Wales, U.K.) and zircon/zirconia composites as described in co-pending application Ser. No. 190,586, filed May 5, 1989, incorporated herein by reference; some preferred compositions include alumina, zirconia, cordierite, silica, silicon nitride, SiAlON, zirconia toughened alumina, SiC whisker reinforced alumina. Exemplary metallic compositions include, but are not limited to, aluminum, nickel, iron, titanium, copper, tungsten, molybdenum, beryllium, and mixtures and alloys thereof, such as steels (e.g., stainless, low alloy, copper, silicon, and the like), brasses, bronze, and so forth; while some metals may oxidize in an aqueous environment, processing can be sufficiently rapid that oxidation is minimal. The present invention is applicable to fine and coarse inorganic powders. This invention is also applicable to a wide variety of particle sizes, including submicron and micron sizes, to a wide variety of particle size distributions, including narrow and wide distributions, and to a wide variety of surface areas, preferably having a specific surface area less than about 100 $m^2/g$, more preferably less than about 25 $m^2/g$.

The particulate compositions described above are formed into a casting or molding slip, preferably one which is highly loaded, that is, having a solids content of at least about 35% by volume, and a slip which is of a very low, pourable viscosity, preferably less than about 5,000 mPa·s at 100 $sec^{-1}$ shear rate; while some formulations may be dilatant, the important aspect is that the slip is pourable. This low, pourable viscosity is achieved by improved particle dispersion in the suspension medium, and allows for proper injection without fill textures, knit or weld lines, or parting line defects. The suspension chemistry can be aqueous or non-aqueous, although the former is preferred due to safety and environmental factors. If the suspension is non-aqueous, it is preferable to use a non-hydrogen bonding medium which exhibits very little if any volume expansion upon freezing, such non-aqueous media including dioxane, ε-caprolactam, cyclohexane, and neopentyl alcohol. In all cases, the maximum volume change on freezing of the vehicle is about that of water, about 10% by volume. Other factors will influence whether a particular vehicle at a specific solids loading is useful; for example, an article designed not to be fully dense may tolerate a large volume change on freezing, and thus could be made using a slip with a lower solids loading, whereas a high tolerance part may require both a high solids loading (i.e., less pore fluid to effect a volume change) as well as a vehicle having a lower volume change on freezing.

In the preferred aqueous system, the solution chemistry includes at least one, most preferably a series, of cryoprotectants. A cryoprotectant can have a dual role of being both a cryoprotectant and a dispersant, a green strength enhancer, and/or a viscosity modifier. In the present invention, a hydrogen bonding dispersant, such as a polyacrylate, which acts as both a dispersing aid to greatly improve dispersion and also as a cryoprotectant, is added to the aqueous suspension. Secondarily, a hydrogen-bonding viscosity modifier to ensure proper rheology may also act as a cryoprotectant as, for example, does methylcellulose ether. Additional components of the aqueous or non-aqueous suspension include a hydrogen bonding green strength enhancer or a viscosity modifier, such as polyvinyl alcohol or methylcellulose. For example, the system can include a plasticizer which also has cryoprotectant properties, such as polyethylene glycol. Further, glycerol can be used as a cryoprotectant, and in some concentrations can also plasticize the dispersant (e.g., NARLEX LD-45) or function as a viscosity modifier (e.g., METHOCEL). Accordingly, an advantageous aspect of this invention is that various components are multifunctional, performing dispersant, cryoprotectant, green strength enhancement, and/or viscosity modification functions. The particular functions are highly dependent on the specific system, especially regarding the compatibility of the components used, as described below.

Slurry or solution viscosity is primarily a function of the effective volume of solid particulates, rather than the weight fraction of solids. In practical terms, a pourable slurry of particles will have a volume fraction of solids less than the maximum packing fraction. As the volume fraction of solids increases, particle-to-particle interactions, whether repulsive or agglomerative, act to increase the viscosity of the slurry. Especially for colloidal particles, the diffuse double layer acts to increase the effective volume fraction of solids. By the use of a surfactant, these particle-to-particle interactions can be decreased, and thus, to a large degree, the solid particles begin to act as individual flow units and provide a pourable viscosity. Although the theoretical aspects of fine particle dispersion are documented in the literature, experts in the field empirically choose a series of conventional dispersing agents to test in the suspension system.

We have discovered that one group of preferred dispersants include polymeric polyelectrolytes. Preferred polymeric polyelectrolytes include acrylic acid based polymers or copolymers, especially those having sodium or ammonium groups (such as those available from National Starch Corp., Bridgewater, N.J., identified by the trade marks NARLEX LD-42 and NARLEX LD-45, or those from R. T. Vanderbilt & Co., Norwalk, Conn., under the designations DARVAN C and DARVAN 821A). Other dispersants include sodium, potassium, or ammonium polyphosphates or pyrophosphates, or other dispersants known in the art, such as water-soluble citrates, silicates, or tartrates. The dispersant may also be an amine, such as a di- or trialkylamine (e.g., diethylamine, tripropylamine), a di- or trialkanolamine (e.g., triethanolamine), N,N-diethylethanolamine, polyethylene imine (e.g., CORCAT P-600 (MW=600,000) or CORCAT P-12 (MW=12,000), available from Virginia Chemical, Portsmouth, Va.), morpholine, or other amine dispersants known in the art. Still other dispersants include polyoxyalkylene derivatives of propylene glycol (e.g., PLURONIC-12, available from BASF-Wyandotte Corp., Parsippany, N.J.), polyethylene glycols (e.g. EMCOL CC-42 and CC-55, available from Witco Chem. Corp., Houston, Tex.), polyvinylpyrrolidone, and vinylacetates. Solution viscosity also affects the suspension viscosity, and suspensions in accordance with the present invention may need a viscosity modifier to ensure proper casting and molding rheology. For example, dimethylsulfoxide (DMSO) as a cryoprotectant also acts to increase suspension viscosity, so one may then add methanol to lower suspension viscosity while still providing a colloidally stable and compatible system.

We have found that it is usually unnecessary to use distilled or deionized water, that tap water usually suffices; we have also found that pure or clean starting powders are also not required. It appears that even the small amounts of dispersant used herein is sufficient to overcome the usual contaminants found in tap water and commercial ceramic and metal powders.

Suitable cryoprotectants are monomeric and polymeric compounds, such as dimethylsulfoxide, methanol, ethanol, isopropanol, ethylene glycol, polyethylene glycol, glycerin, 1,2-propanediol, urea, sugar (e.g., sucrose, raffinose), aminoacetic acid, oxalic acid, glycerol, polyvinyl alcohol, methylcellulose, ethylcellulose, polyvinylpyrrolidone, and the like.

The molding composition can also include a viscosity modifiers or green strength enhancer; as described above, various components of the system may be multifunctional. Illustrative of these additives are polyvinyl alcohol, methyl- and ethylcellulose ethers (e.g., METHOCEL, available from Dow Chemical, Midland, Mich.), and glycols such as polyethylene glycol and methoxypolyethylene glycol (e.g. CARBOWAX, available from Union Carbide, New York, N.Y.).

It is an important aspect of the present invention that the cryoprotectant and the dispersant be compatible with respect to dispersion stability, cryoprotection, green strength, and viscosity. For example, regarding dispersion stability, the use of acetone in some systems as opposed to dimethylsulfoxide may decrease dispersion stability and result in agglomerates, and thereby result in an increase in slurry viscosity and inhomogeneity. As another example, the dispersant should not decrease the effect of the cryoprotectant, by which large crystals and resulting property defects would be created. Accordingly, the skilled artisan must test the dispersant/cryoprotectant system desired to determine whether the components are sufficiently compatible. The illustrations of this invention described below include systems that are compatible, as determined solely by experimentation, because no approach is known for determining compatible systems other than by empirical methods.

A preferred method is described in more detail in co-pending application Ser. No. 412,108, which describes an emulsion useful as the slip. By this method, an oil/water or water/oil emulsion can be used as the slip vehicle, whereby the volume expansion of water during freezing may be offset by the volume shrinkage during freezing of the non-aqueous phase.

In one preferred embodiment of the present invention, the cryoprotectant contains a mixture of compounds, one of which is especially methanol. While methanol alone may not provide suitable cryoprotection, in combination with another cryoprotectant (such as dimethylsulfoxide), it is believed that the methanol acts as an ice plasticizer, viscosity modifier, and drying rate enhancer.

Various particulate-dispersant systems and the fabrication of low viscosity, pourable, highly loaded suspensions are described in U.S. Pat. Nos. 4,882,304 and 4,904,411, and in co-pending application Ser. No. 355,036, filed May 16, 1989, and U.S. Pat. No. 4,816,182, the disclosures of which are all incorporated herein by reference. Particles of a desired or approximate size range can be obtained by the techniques described in U.S. Pat. No. 4,781,671 and in U.S. Pat. No. 4,882,088, and in co-pending application Ser. No. 338,492, filed Apr. 13, 1989, the disclosures of which are incorporated herein by reference.

The particulate powders, water, and additives are carefully mixed together under high shear rate to produce a fluid, pourable slurry which is then filtered. Filtering is typically achieved by a series of filters having an average pore size of about 10 microns. Although not essential, it is preferred to filter the slurry to remove foreign debris which may accumulate from the surrounding air, from various containers, or which may be present in the raw materials. Such foreign debris has been shown to produce microstructural contamination, inhomogeneity, and strength limiting defects.

The resulting suspension is deaired and injected into a mold. Injection is typically accomplished at low pressure, which is generally less than 200 psi, preferably less than 100 psi, and can even be injected using a hand-held syringe; also, as mentioned above, the slips are pourable. It is important to note that as used herein, the term "pourable" means that the slip can flow in a continuous stream under gravity head, that the slip will fill a mold cavity as would a true liquid. Thus, for example, the pourable slips of this invention can be contrasted with a dry powder which, although it can be poured, can flow in a continuous stream under gravity head, is clearly different than a fluid slip; for example, if poured into a mold cavity, vibrational energy is applied to increase the packing density (which would not be necessary or beneficial with a liquid). As a further distinction are the typical highly loaded slips of the art (e.g., as in Weaver et al.), which may be described as "poured" into a mold, but which also require vibration for complete mold filling; in essence, such slips are not sufficiently fluid that they would fill a mold volume without vibration or other energy as can a true liquid or the low viscosity, pourable slips of this invention.

The present slips preferably have a viscosity of not more than about 1000 cPs at a moderate shear rate (between about 10 sec.$^{-1}$ and 1000 sec.$^{-1}$, preferably at 100 sec.$^{-1}$; see Patton, Temple C., *Paint Flow and Pigment Dispersion* (New York: John Wiley & Sons, 1979), chpt. 16, on the importance of defining the shear rate regime at which viscosity is measured). More preferably the viscosities are on the order of 200 cPs at 100 sec.$^{-1}$. As mentioned, the slips may also be dilatant, so they will not readily flow at high shear rates, even though they are still pourable. Viscosity is also effected by the volume fraction of solids and the particle size distribution. More preferred solids loadings for structural ceramics are at least 50% by volume, most preferably at least 55% by volume.

The mold material may be soft or hard, such as silicone rubber, wax, alumina, or tool steel. The molds preferably are cold prior to injection, such as typically $-50°$ C. to $-80°$ C., or can be warm, in which case the mold is quenched to within the desired temperature range subsequent to filling. In the latter instance, the rate at which the mold is cooled can be either fast or slow. It is preferable that the cooling rate be fast, which may additionally aid the inhibition of ice crystal formation, and which also makes the entire process more rapid; a mold chilled prior to filling, and especially one in combination with a chiller or refrigerant system, provides very rapid freezing. A preferred embodiment includes performing the foregoing steps in a closed (i.e., hermetic, isolated) system to avoid contamination of the materials. It is also possible to perform the subsequent steps in a closed system.

The formed, solidified part is demolded and freeze dried. As used herein, the "freeze drying" process involves non-destructive sublimation of the pore fluid medium. Processing may be accomplished in discrete stages wherein the article is slowly heated during the non-destructive sublimation. Accordingly, some evaporation may occur during the sublimative drying process. Nevertheless, such an occurrence is included within the present invention. An advantage of freeze drying is that there is very little shrinkage and the shrinkage is very controlled during drying. The resulting green part is easily handled and is then put into a sintering furnace. Accordingly, the present invention obviates the need for a binder burnout step. As noted above, it is preferred that the starting slurry be highly loaded, and this high solids content also acts to decrease the drying time by concomitantly decreasing the amount of pore fluid medium to be removed. The suspension chemistry preferably should utilize components having low heats of sublimation.

There are some aspects of freeze drying which are critical for fabricating high performance, high tolerance articles. As the pore fluid freezes, it is possible that there will be a composition difference across the freezing front (e.g., there may be various eutectic and/or peritectic points created), and this may result in localized micropockets of the vehicle that have such a low freezing point that they remain fluid; likewise, although again not desirous of being bound to a particular theory or mechanism, such micropockets may have been inhibited from freezing by volume constraints (e.g., the liquid must expand to freeze, even if only slightly, but is essentially encapsulated in frozen pore fluid). Thus, there may be micropockets of fluid which, because they are not frozen, will evaporate rather than sublimate during drying.

It is important to avoid a continuous liquid phase during drying. A continuous liquid phase, by which liquid spans particles, allows for capillary forces between the particles; these capillary forces are detrimental for a number of reasons: they cause the particles in the green body to move or rearrange, thereby destroying the homogeneity of the green article; they create stresses that are likely to crack the part during drying; and they create stresses that are latent to the extent that the part appears to be whole upon drying but cracks during sintering.

To control the sublimative drying to avoid the formation of a continuous liquid phase, it is usually sufficient to control the part temperature to below the melting temperature of the pore fluid. In fact, because sublimation of water is a highly endothermic process, the part temperature actually decreases during drying. The drying rate is also effected by, among other factors, the vapor pressure of the vehicle (frozen pore fluid) at the part versus that at the freeze drying heat sink (usually a condenser); thus, as the part temperature decreases, the drying rate would also decreases. To maintain a usefully rapid drying rate it is common practice in freeze drying ceramic powders to heat the freeze dryer shelves or supports; similarly, as described, for example, in the patent to Weaver et al., heat is added to facilitate drying (that is, the frozen aqueous system is dried in vacuum, but at temperatures above the freezing point of the vehicle). In the practice of this invention, although heating the parts during drying is contemplated (and desireable in some instances to maintain an adequate drying rate), the critical aspect is to maintain the part temperature to below the melting temperature of the vehicle. For example, then, assuming the vehicle freezes at about 0°, preferably the part would be heated to maintain its temperature at about $-20°$ to $-5°$. The parts can be heated by such methods as the use of heat lamps, controlling the freeze dryer shelf temperature, and the like.

The avoidance of ice crystals of a size incompatible with high performance ceramics is achieved by the present invention utilizing one or more of the following techniques: (a) the addition of one or more chemical additives for cryoprotection and dispersion; (b) use of a sufficiently high solids content while maintaining a pourable viscosity; and (c) use of a suitably rapid cooling rate for solidification of the vehicle. We have found that rapidly cooled suspensions may not require the same concentrations of cryoprotectants as more slowly cooled suspensions in otherwise congruent circumstances. It will be appreciated that these techniques interact with one another, and the employment of one can affect the extent to which another may need to be employed in order to achieve desired results. Our examination of fired and green ceramics made in accordance with the present invention reveals that the techniques herein achieve ceramics that are substantially free of defects in a size range greater than approximately 10 microns. Further, we have created formulations that have stable pot lives in excess of 60 days without stirring except just prior to use.

The present invention is illustrated by the following specific embodiments, which are not meant to be limiting.

EXAMPLE 1

This example describes the production of a funnel-shaped part about 4 in. long, having an inner diameter of about 1.75 in. (4.445 cm) tapering down to about 0.75 in. (1.905 cm), an outer diameter tapering from about 2.0 in. (5.08 cm) to about 1.0 in. (2.54 cm), and a thickest cross-section of about 0.375 in. (0.952 cm).

Alumina powder (designated A-16 SG, available from Aluminum Co. of America, Pittsburgh, Pa.) was used as-received in an amount of about 50%-57% by volume in an aqueous medium, the actual amount depending on the firing shrinkage desired. Also included was about 1% by weight, based on the powder, of a dispersant such as an acrylate-based polymeric polyelectrolyte (designated NARLEX LD-45, available from National Starch Co., Bridgewater, N.J.). This amount of dispersant is sufficient to impart adequate strength to the dried green part, although up to about 3 wt. % of the dispersant may be desirable at a lower solids loading fraction. Additional components included 10 vol. % dimethylsulfoxide as a cryoprotectant and 5 vol. % methanol, which aids in drying, and 0.25% NALCO 2309 (NALCO Chemicals, Chicago, Ill.) as an antifoaming agent, all amounts based on the pore fluid volume. The balance of the composition is water.

A highly loaded, pourable suspension was made by mixing the components overnight, such as on a roller mill or with a paint shaker. The final viscosity of the suspension was about 150-200 mPa·s (shear rate of 100 sec$^1$) as measured on a Haake viscometer.

A mold was prepared from a steel cavity to define the outer surface of the part and a steel mandril placed concentrically therein to define the inner surface.

After batching and milling, the pourable suspension was deaired and injected into the steel mold, which was just previously frozen to about −78°C. Before five minutes had elapsed, the suspension was frozen and the green part was demolded and easily handled. The green part was freeze dried for a period of about 20 hours at a pressure of no more than about 60 microns Hg. After freeze drying, the part was sintered at about 1500° C. for about 4 hours, conditions typical for alumina sintering. The sintered part had a uniform grain size and a density of 97+% theoretical.

COMPARATIVE EXAMPLE

An aqueous based slip was provided composed of 59% alumina, 15% methanol, 2% dispersant (weight fraction of NARLEX LD-45 as based on the powder), and the remainder water. The slip was injected into a chilled mold as in the previous example. In comparison with the present invention, the solidified part was dried in a vacuum desiccator (this would be identical to drying with a vacuum oven maintained at room temperature). The part melted during drying.

We have done other experiments and found similarly that the use of a fluid or pourable slip as a starting material necessitates control of the drying conditions. The results of such experiments showed that drying under conditions where thawing can occur is likely to yield parts with drying cracks. Even parts that appeared to dry properly when dried at a temperature above the freezing temperature of the pore fluid cracked upon sintering, even with a very conservative sintering schedule; such cracking is symptomatic of stress-induced defects caused by the formation of a continuous liquid phase during sintering.

EXAMPLE 2

This example describes the production of a set of household slip joint pliers, including the jaws, teeth, slip joint, and handle curvature. The parts are about 12 in. (30.48 cm) long, about 1.25 in. (3.175 cm) at the widest point, and about 0.5 in. (1.270 cm) at the thickest cross section.

The molding suspension included about 45 vol. % solids of a yttria (3 mol. %) partially stabilized zirconia (designated as HSY-3.0 grade available from Daiichi Kigenso Kagaku Kagyo Co., Ltd., Osaka, Japan), having an average particle size of about 1.0 micron and a specific surface area of about 7 m$^2$/g. Three weight percent of a dispersant (NARLEX LD-45, based on dry ceramic powder weight) was used to disperse the powder, and was also present in an amount sufficient to give adequate green strength to the dried part. As in the previous example, 10 vol. % dimethylsulfoxide and 5 vol. % methanol, based on the pore fluid volume, were added as cryoprotectant and drying additive, respectively. The remainder was water. Mixing under high shear was performed as in the previous example.

The resulting pourable suspension was deaired and injected into an aluminum mold at room temperature. The filled mold was then placed in a −78° C. environment for about 30 min. to completely freeze the part. Thereafter, the part was demolded and freeze dried as described above. The dried part was sintered at about 1600.C for about 4 hours. The resulting microstructure was a 99+% dense uniform grain size zirconia part.

EXAMPLE 3

This example describes the production of a more complex, three-dimensional shape; in particular, a four-vane rotor about 2 in. (5.08 cm) in diameter and about 2 in. (5.08 cm) high. The rotor geometry includes a hollow conical hub to which four helically shaped vanes are attached, having a 90 angle between their leading and tailing edges; the vanes have a cross sectional thickness of about 0.25 in. (0.635 cm) tapering to about 0.125 in. (0.318 cm) at their outer edges.

The molding suspension was formed from about 55 vol. % of a low carbon 304 stainless steel powder having a particle size less than about 22 microns (designated as TP304L grade, available from Avesta Nyby Powder AB, Torshalla, Sweden). Also added was about 3 wt. % of a dispersant (NARLEX LD-45, based on dry powder weight). Due to the high density (7.9 g/cm$^3$) and the relatively large particle size of the powder, it was found necessary to increase the suspension viscosity to provide a stable suspension (i.e., no sedimentation). This was accomplished by adding 0.05 wt. % (dry powder basis) of a cellulose ether polymer (designated METHOCEL 20-121, available from Dow Chemicals, Midland, Mich.); this viscosity modifier also enhances the green strength of the dried part. As a cryoprotectant, 5 vol. % dimethylsulfoxide (pore fluid basis) was added; no methanol was used; 0.25 vol % NALCO 2309 was added as an antifoaming agent; the remainder was water.

The composition was batched and milled as described previously to achieve a pourable, stable suspension. The suspension was then deaired and injected into a mold previously frozen to about −78° C. Within about 1 min., the part was frozen and was thereafter demolded. The demolded part was subsequently freeze dried as described above. The dried part was fired using appropriate and conventional parameters applicable to metal powder furnaces and atmospheres therefor.

EXAMPLE 4

This example describes the formation of a ceramic billet in which a single component functions as both a dispersant and a cryoprotectant, and additionally functions as a green strength enhancer.

A molding suspension was prepared from about 45 vol. % yttria solids including about 3 mol % partially stabilized zirconia (HSY-3.0 grade, as in Example 2). The remaining 55 vol. % pore fluid was composed of water and a polymeric polyelectrolyte dispersant/cryoprotectant (NARLEX LD-45, as described above). The molding/casting composition thereby was composed of about 45 vol. % ceramic particles, about 10 vol. % dispersant/cryoprotectant, and about 45 vol. % water.

The suspension was molded and processed as described in Example 2. The ceramic billet had the fired dimensions of approximately 50 mm × 50 mm × 5 mm.

The foregoing descriptions are meant to illustrate this invention, and modifications thereof are meant to be within the scope and spirit of the invention as defined by the following claims.

What is claimed is:

1. A process for producing a sintered ceramic or metallic article, comprising:
   a. providing a stable, pourable suspension consisting essentially of at least about 35 vol % solid ceramic particles or metallic particles or combinations thereof and a vehicle composed of a dispersant selected from the group consisting of acrylate-based polymeric polyelectrolytes and polyethylene imines, at least one cryoprotectant, and the remainder water;
b. shaping the suspension in a closed mold at a pressure of less than about 200 psi;
c. chilling the mold temperature to less than the freezing point of the vehicle;
d. solidifying the shaped suspension by rapidly freezing the shaped suspension;
e. freeze drying the solidified shape below the freezing point of the vehicle without the formation of a continuous liquid phase; and
f. firing the dried shape.

2. The process as defined by claim 1, wherein the suspension further comprises a drying agent.

3. The process as defined by claim 1, wherein the suspension further comprises a viscosity modifier.

4. The process as defined by claim 1, wherein the cryoprotectant is selected from the group consisting of dimethylsulfoxide, methanol, ethanol, isopropanol, ethylene glycol, polyethylene glycol, glycerin, 1,2-propanediol, urea, sugar, aminoacetic acid, oxalic acid, glycerol, polyvinyl alcohol, methylcellulose, ethylcellulose, polyvinylpyrrolidone, and mixtures thereof.

5. The process as defined by claim 4, wherein the cryoprotectant includes a mixture of at least two cryoprotectants.

6. The process as defined by claim 1, wherein the step of shaping is by low pressure injection molding.

7. The process as defined by claim 1, wherein the particles are a ceramic selected from among the oxides, carbides, nitrides, silicides, borides, silicates, titanates, zirconates, and mixtures thereof, of aluminum, beryllium, boron, lanthanum, lead, silicon, tungsten, titanium, zirconium, and mixtures thereof.

8. The process as defined by claim 7, where the ceramic is alumina, zirconia, cordierite, silica, silicon nitride, sialon, zirconia toughened alumina, SiC whisker reinforced alumina, or mixtures thereof.

9. The process as defined by claim 1, wherein the particles are composed of a metal selected from among aluminum, nickel, iron, titanium, copper, tungsten, molybdenum, beryllium, and mixtures and alloys thereof.

10. The process as defined by claim 1, wherein step (b) precedes step (c).

11. The process as defined by claim 1, wherein step (c) precedes step (b).

12. The process as defined by claim 1, wherein the volume fraction of solids is at least 50% by volume.

13. The process as defined by claim 12, wherein the volume fraction of solids is at least 55% by volume.

* * * * *